(12) United States Patent
Wang-Lee

(10) Patent No.: US 6,467,902 B2
(45) Date of Patent: Oct. 22, 2002

(54) ANGLE ADJUSTMENT MECHANISM FOR TEMPLE OF EYEGLASSES

(76) Inventor: Tzu-Feng Wang-Lee, No. 40, Lane 30, Lung Chung St., Yung Kang, Tainan County (TW)

( * ) Notice: Subject to any disclaimer, the term of this patent is extended or adjusted under 35 U.S.C. 154(b) by 0 days.

(21) Appl. No.: 09/748,415

(22) Filed: Dec. 26, 2000

(65) Prior Publication Data

US 2002/0122152 A1 Sep. 5, 2002

(51) Int. Cl.$^7$ ................................................. G02C 5/14
(52) U.S. Cl. ...................................... 351/120; 351/110
(58) Field of Search ................................. 351/120, 140, 351/110, 111, 116, 118, 119, 153; 16/228

(56) References Cited

U.S. PATENT DOCUMENTS 5,565,937 A * 10/1996 Lee ............................ 351/120
5,638,147 A * 6/1997 Lee ............................ 351/120

* cited by examiner

*Primary Examiner*—Hung Xuan Dang
(74) *Attorney, Agent, or Firm*—Alan Kamrath; Rider, Bennett, Eagan & Arundel, LLP

(57) ABSTRACT

An angle adjustment mechanism for a temple of eyeglasses comprises a square recess at an endpiece of a rim, a hole through the square recess, an abutment member including a square member shaped to conform to the square recess, an annular projection on the square member, a first annular toothed portion spaced from the square member by the annular projection, and a plurality of slits across the first annular toothed portion for providing a flexibility when the first annular toothed portion is compressed, a pivot member pivotably secured to the temple, the pivot member including an annular recess and a second annular toothed portion on the bore of an aperture therethrough, and an engagement member including a plurality of protrusions with latched ends, any two adjacent protrusions being separated by a gap. The protrusions are inserted through the pivot member, the abutment member, the square recess, and the hole for pivotably securing them together wherein the annular recess is engaged with the annular projection and the second annular toothed portion is meshed with the first annular toothed portion.

1 Claim, 5 Drawing Sheets

ANGLE ADJUSTMENT MECHANISM FOR TEMPLE OF EYEGLASSES

FIELD OF THE INVENTION

The present invention relates to eyeglasses and more particularly to an angle adjustment mechanism for temple of eyeglasses with improved characteristics.

BACKGROUND OF THE INVENTION

Conventionally, a temple of eyeglasses may be fixed to rim or pivotal about rim. As to the latter, an angle adjustment mechanism is provided at the joint of temple and rim. However, the prior angle adjustment mechanisms have suffered certain deficiencies such as limited flexibility, structural complexity, and inconvenience in use. Thus, it is desirable to provide an improved angle adjustment mechanism for temple of eyeglasses in order to overcome the above drawbacks of prior art.

SUMMARY OF THE INVENTION

It is an object of the present invention to provide an angle adjustment mechanism for a temple of eyeglasses comprising a square recess at an endpiece of a rim of the eyeglasses, a hole through the square recess, an abutment member including a square member shaped to conform to the square recess, an annular projection on the square member, a first annular toothed portion spaced from the square member by the annular projection, and a plurality of slits across the first annular toothed portion for providing a flexibility when the first annular toothed portion is compressed, a pivot member pivotably secured to the temple, the pivot member including an annular recessed portion and a second annular toothed portion on the bore of an aperture therethrough, and an engagement member including a plurality of protrusions with latched ends, any two adjacent protrusions being separated by a gap such that the protrusions are capable of inserting through the pivot member, the abutment member, the square recess, and the hole for pivotably securing them together wherein the annular recessed portion is snugly engaged with the annular projection and the second annular toothed portion is meshed with the first annular toothed portion. Thus, it is possible to pivot temple with respect to rim for obtaining an optimized angle therebetween.

The above and other objects, features and advantages of the present invention will become apparent from the following detailed description taken with the accompanying drawings.

DETAILED DESCRIPTION OF THE PREFERRED EMBODIMENTS

Figure 1:
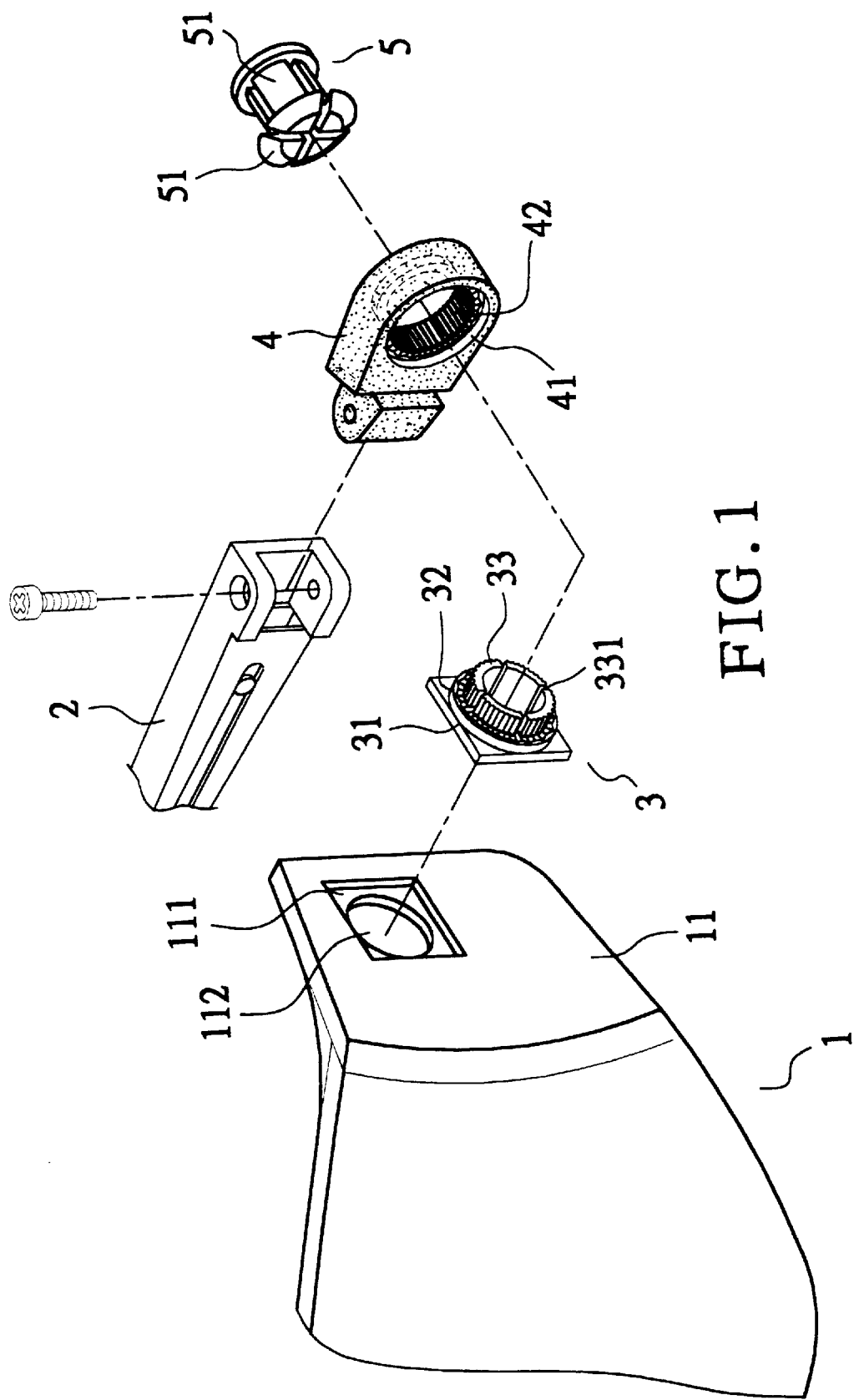
FIG. 1 is an exploded view of an angle adjustment mechanism for temple of eyeglasses according to the invention.
Figure 2:
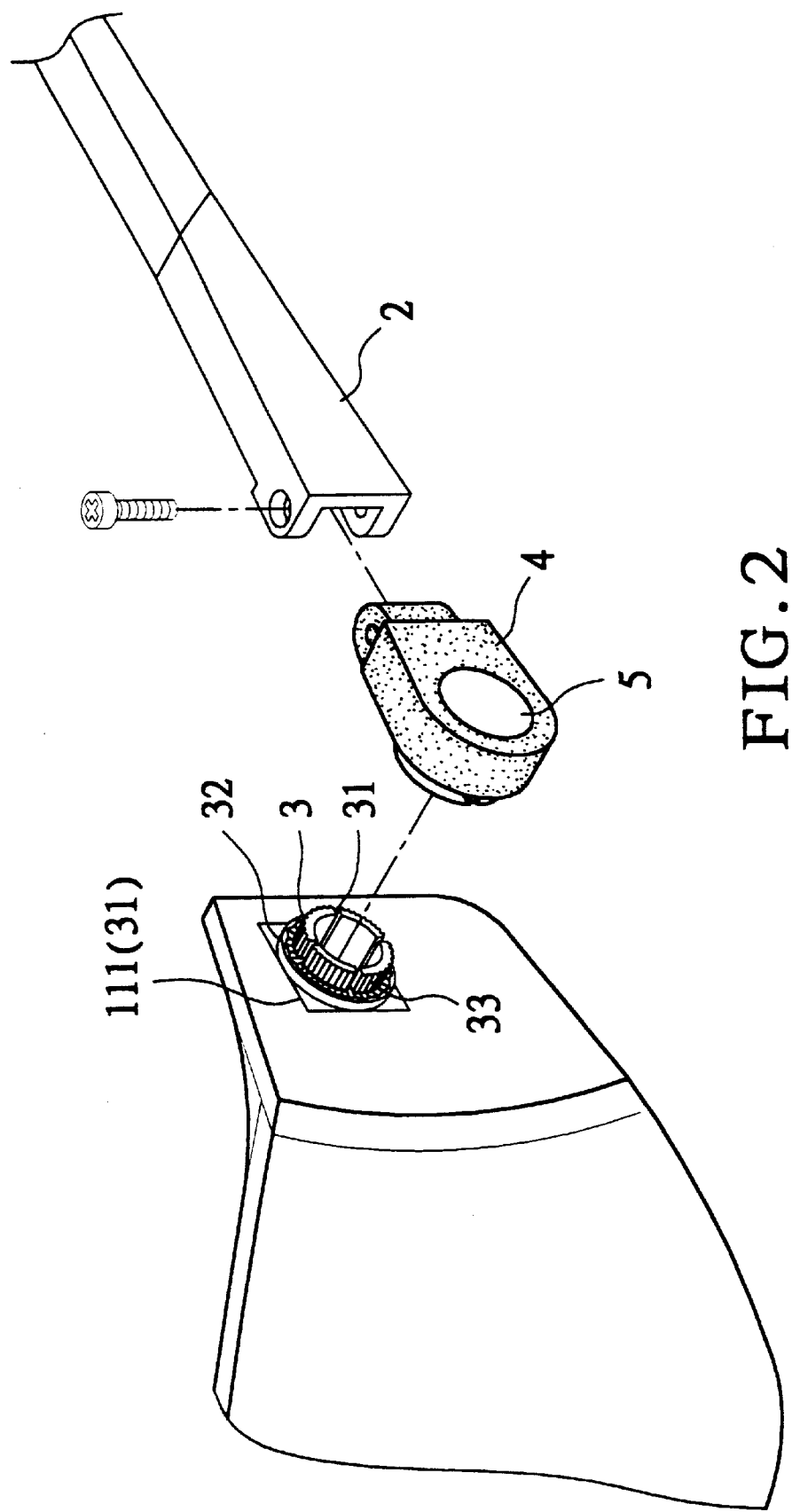
FIG. 2 is a partially assembled view of the FIG. 1 device.
Figure 3:
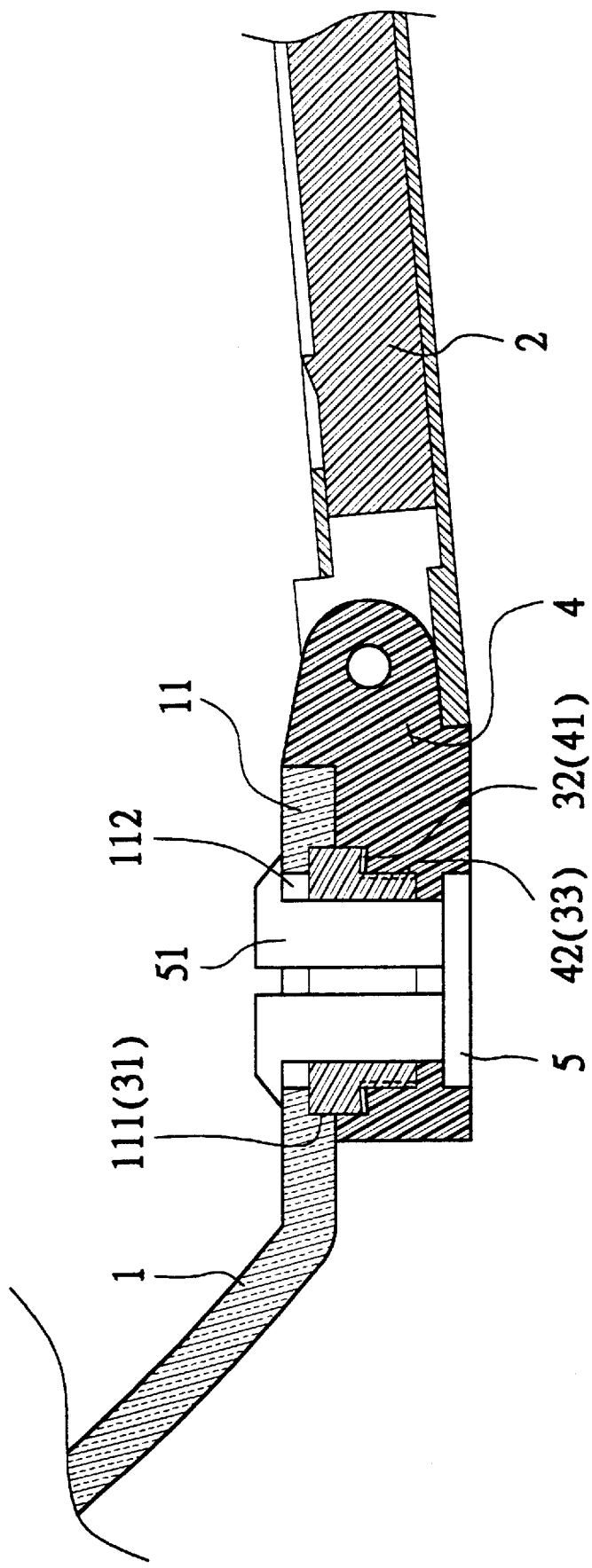
FIG. 3 is a cross sectional view of the assembled FIG. 1 device.
Figure 4:
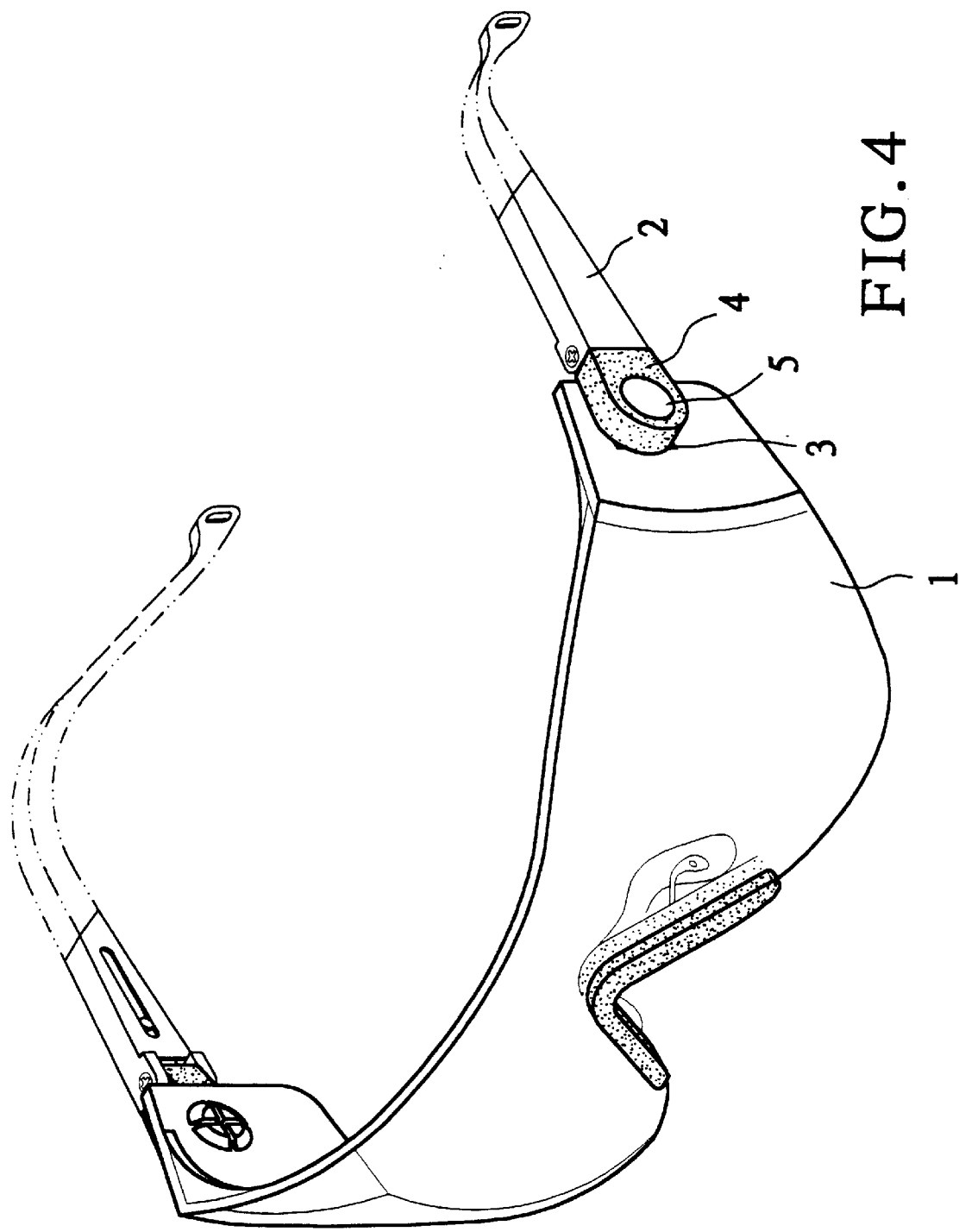
FIG. 4 is a perspective view of an eyeglasses incorporating the angle adjustment mechanism according to the invention.
Figure 5:
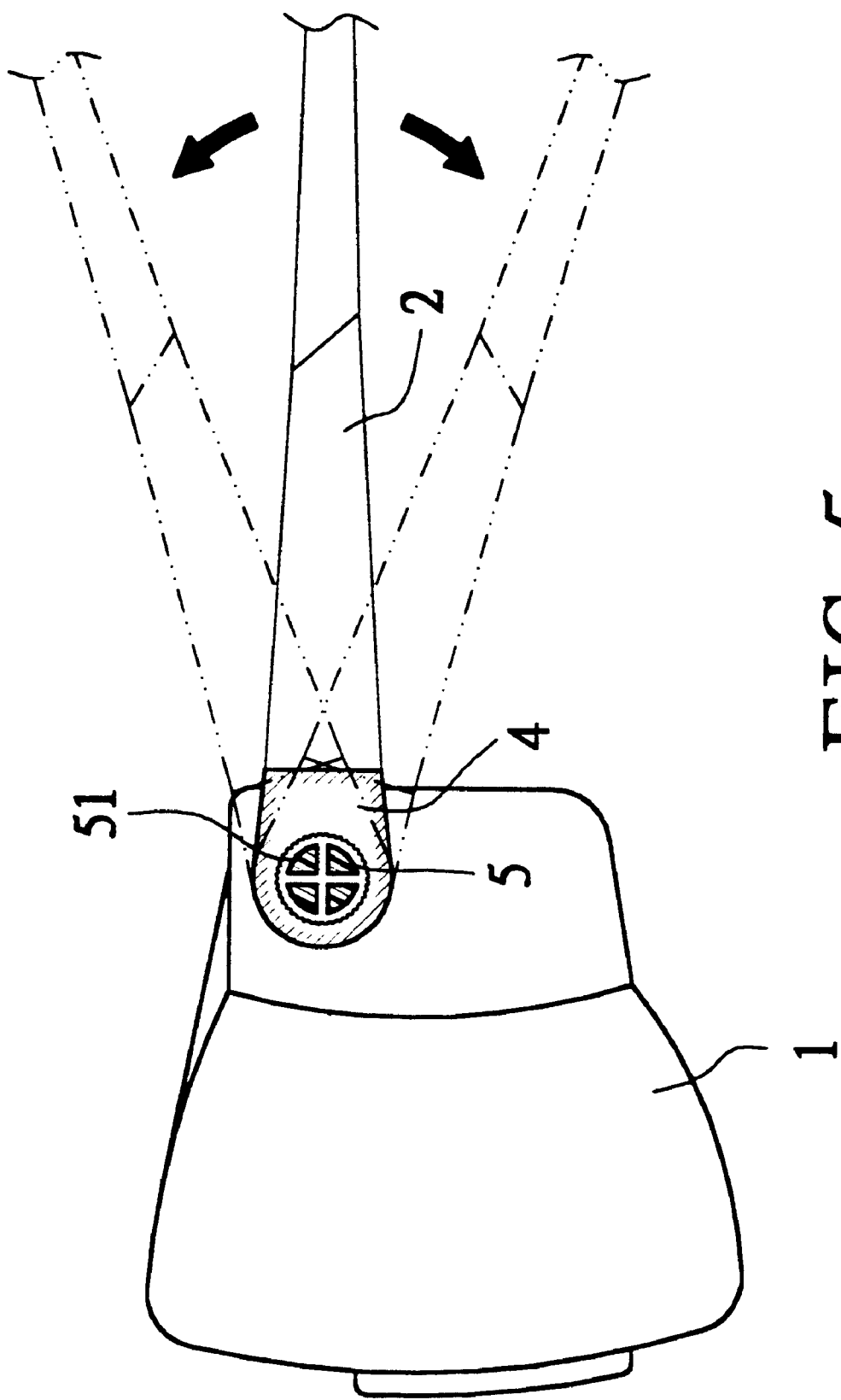
FIG. 5 is a side view illustrating the angle adjustment operation of the FIG. 4 temple of eyeglasses.

Referring to FIGS. 1 through 5, there is shown a pair of eyeglasses incorporating an angle adjustment mechanism according to the invention. As shown, a square recess 111 is formed at an endpiece 11 of rim 1. A through hole 112 is formed at the center of square recess 111. An abutment member 3 is formed and is comprised of a square member 31 shaped to conform to square recess 111, an annular projection 32 on square member 31 at the external side, a first annular toothed portion 33 spaced from square member 31 by annular projection 32, and a plurality of (two are shown) slits 331 across first annular toothed portion 33 for providing a flexibility when first annular toothed portion 33 is compressed. A pivot member 4 is pivotably secured to temple 2 by means of a fastener (e.g., screw). Pivot member 4 includes an annular recessed portion 41 and a second annular toothed portion 42 on the bore of a hole therethrough. An engagement member 5 has a plurality of (four are shown) protrusions 51 with latched ends. Each protrusion 51 is separated from an adjacent one by a gap. This is a flexibility design. As such, protrusions 51 of engagement member 5 are capable of inserting through pivot member 4, abutment member 3, square recess 111, and hole 112 for pivotably securing them together wherein annular recessed portion 41 is snugly engaged with annular projection 32 and second annular toothed portion 42 is meshed with first annular toothed portion 33 (see FIGS. 3 and 4). Referring to FIG. 5 specifically, user may pivot temple 2 with respect to rim 1 for obtaining an optimized angle therebetween.

While the invention has been described by means of specific embodiments, numerous modifications and variations could be made thereto by those skilled in the art without departing from the scope and spirit of the invention set forth in the claims.

What is claimed is:

1. An angle adjustment mechanism for a temple of eyeglasses comprising:

a square recess at an endpiece of a rim of said eyeglasses;

a hole through said square recess;

an abutment member including a square member shaped to conform to said square recess, an annular projection on said square member, a first annular toothed portion spaced from said square member by said annular projection, and a plurality of slits across said first annular toothed portion;

a pivot member pivotably secured to said temple, said pivot member including a second annular toothed portion therethrough and an abutted annular recessed portion; and an engagement member including a plurality of protrusions with latched ends, any two adjacent protrusions being separated by a gap;

wherein said protrusions are inserted through said pivot member, said abutment member, said square recess, and said hole for pivotably securing them together with said annular recessed portion being engaged with said annular projection and said second annular toothed portion being meshed with said first annular toothed portion.

* * * * *